US010135279B2

(12) United States Patent
Luo et al.

(10) Patent No.: US 10,135,279 B2
(45) Date of Patent: Nov. 20, 2018

(54) METHOD AND APPARATUS OF BATTERY CHARGING (71) Applicant: NINGDE AMPEREX TECHNOLOGY LIMITED, Ningde, Fujian Province (CN)

(72) Inventors: Fuping Luo, Ningde (CN); Yu Luo, Ningde (CN); Shengwei Wang, Ningde (CN); Zhanzhao Fang, Ningde (CN); Chao Gao, Ningde (CN); Qiang Zheng, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 36 days.

(21) Appl. No.: 15/626,951

(22) Filed: Jun. 19, 2017

(65) Prior Publication Data
US 2017/0366015 A1 Dec. 21, 2017

(30) Foreign Application Priority Data

Jun. 20, 2016 (CN) .......................... 2016 1 0447577

(51) Int. Cl.
*H02J 7/00* (2006.01)
*H01M 10/0525* (2010.01)
*H01M 10/44* (2006.01)

(52) U.S. Cl.
CPC ......... *H02J 7/007* (2013.01); *H01M 10/0525* (2013.01); *H01M 10/44* (2013.01); *H02J 7/00* (2013.01); *H02J 7/0045* (2013.01)

(58) Field of Classification Search
CPC ...................................................... H02J 7/007
(Continued)

(56) References Cited

U.S. PATENT DOCUMENTS

2012/0303208 A1 11/2012 Hariharan
2015/0318717 A1 11/2015 Yamauchi et al.

FOREIGN PATENT DOCUMENTS

CN 101192757 A 6/2008
CN 101303397 A 11/2008
(Continued)

OTHER PUBLICATIONS

European search report dated Nov. 23, 2017 for corresponding application No. EP 17176761.9.
(Continued)

*Primary Examiner* — Edward Tso
*Assistant Examiner* — Ahmed Omar
(74) *Attorney, Agent, or Firm* — Nath, Goldberg & Meyer; Jerald L. Meyer (57) ABSTRACT

Embodiments of the present application provide a method of battery charging, which relates to the field of battery charging and is capable of effectively improving safety performance of the battery. The method includes: obtaining an anode open circuit voltage curve, an anode impedance curve, a lithium deposition potential threshold and a state of charge, corresponding to a battery; determining a current anode open circuit voltage according to the anode open circuit voltage curve and the state of charge; determining a current anode impedance according to the anode impedance curve and the state of charge; determining a current charging current according to the current anode open circuit voltage, the current anode impedance and the lithium deposition potential threshold; and charging the battery according to the current charging current. Embodiments of the present application are applicable to a rapid battery charging process.

14 Claims, 11 Drawing Sheets

(58) Field of Classification Search
USPC .......................................................... 320/137
See application file for complete search history.

(56) References Cited

FOREIGN PATENT DOCUMENTS

| | | |
|---|---|---|
| CN | 102948036 A | 2/2013 |
| CN | 103187597 A | 7/2013 |
| EP | 2933898 A1 | 10/2015 |
| JP | 2014143138 A | 8/2014 |

OTHER PUBLICATIONS

Chinese office action dated Jan. 19, 2018 for corresponding application No. CN 201610447577.6 with English translation attached.

METHOD AND APPARATUS OF BATTERY CHARGING

CROSS-REFERENCE TO RELATED APPLICATIONS

The present application claims the benefit of priority to Chinese Patent Application No. 201610447577.6, filed on Jun. 20, 2016, the content of which is incorporated herein by reference in its entirety.

TECHNICAL FIELD

The present application relates to the field of battery charging and, more particularly, to a method and an apparatus of battery charging.

BACKGROUND

After more than 20 years of development, the energy density of the Li-ion battery has been significantly improved, however, with the development of the Li-ion battery technology to the present, the improvement of the energy density has reached a bottleneck stage. Under a limited energy density, how to improve the charging speed of the battery so as to effectively improve user experience is a widely concerned problem. Currently, the charging manner generally applied to the lithium battery is to continuously charge with a preset constant current to a certain potential and then charge under a constant voltage on this potential. Such a charging manner may cause the anode potential to drop constantly, thus causing lithium ions to be reduced to lithium metal and deposited on the anode surface. In this case, the generated lithium dendrites will be accumulated on the electrode surface, thereby threatening safety performance of the battery.

SUMMARY

Accordingly, embodiments of the present application provide a method of battery charging, which is capable of effectively improving safety of the battery.

In a first aspect, an embodiment of the present application provides a method of battery charging, including steps of:

obtaining an anode open circuit voltage curve, an anode impedance curve, a lithium deposition potential threshold and a state of charge corresponding to a battery;

determining a current anode open circuit voltage according to the anode open circuit voltage curve and the state of charge;

determining a current anode impedance according to the anode impedance curve and the state of charge;

determining a current charging current according to the current anode open circuit voltage, the current anode impedance and the lithium deposition potential threshold; and charging the battery with the current charging current.

In a first implementation of the first aspect by combining the first aspect, the step of determining the current charging current according to the current anode open circuit voltage, the current anode impedance and the lithium deposition potential threshold includes:

determining the current charging current I according to a formula $I=(U_a-\eta)/R_a$; wherein, $U_a$ is the current anode open circuit voltage, $R_a$ is the current anode impedance, and $\eta$ is the lithium deposition potential threshold.

In a second implementation by combining the first implementation of the first aspect, the step of charging the battery according to the current charging current includes:

detecting whether a charging voltage of the battery reaches a cut-off voltage when charging the battery;

charging the battery with the current charging current when the charging voltage of the battery is below the cut-off voltage;

when the charging voltage of the battery reaches the cut-off voltage, maintaining the charging voltage, and charging the battery with a cut-off current until the battery is fully charged.

In a third implementation by combining the second implementation of the first aspect, the step of obtaining the anode open circuit voltage curve corresponding to the battery includes:

charging the battery with a test current;

when charging the battery with the test current, determining the anode open circuit voltage curve corresponding to the battery by collecting a plurality of potential difference between an anode of the battery in different state of charge and a reference electrode, so as to determine the anode open circuit voltage curve corresponding to the battery.

In a fourth implementation by combining the second implementation of the first aspect, the step of obtaining the anode impedance curve includes:

obtaining a first discharging potential and a second discharging potential of the battery, the first discharging potential is a potential of the battery after the battery is continuously discharged with a first discharging current within a first discharging period, and the second discharging potential is a potential of the battery after the battery is continuously discharged with a second discharging current within a second discharging period;

calculating an anode impedance according to a formula $R_a=(U_1-U_2)/(I_2-I_1)$; $U_1$ is the first discharging potential, $U_2$ is the second discharging potential, $I_2$ is the first discharging current, and $I_1$ is the second discharging current;

determining the anode impedance curve corresponding to the battery by collecting anode impedances of the battery in different state of charge respectively.

In a fifth implementation by combining the second implementation of the first aspect, the step of obtaining the lithium deposition potential threshold includes:

charging the battery with a maximum safe charging current;

determining the lithium deposition potential threshold by collecting a minimum potential difference from a plurality of potential difference between an anode corresponding to the battery and a reference electrode when charging the battery with a maximum safe charging current.

In a sixth implementation by combining the third, fourth or fifth implementation of the first aspect, after the step of charging the battery according to the current charging current, the method further includes:

when a number of charge cycles of the battery reaches a preset number, adjusting the obtained anode open circuit voltage curve and the anode impedance curve according to a. current maximum available capacity of the battery.

In a second aspect, an embodiment of the present application further provides an apparatus of battery charging, including:

a detecting module, configured to obtain an anode open circuit voltage curve, an anode impedance curve, a lithium deposition potential threshold and a state of charge corresponding to a battery;

a first calculating module, configured to determine a current anode open circuit voltage according to the anode open circuit voltage curve and the state of charge;

a second calculating module, configured to determine a current anode impedance according to the anode impedance curve and the state of charge;

a third calculating module, configured to determine a current charging current according to the current anode open circuit voltage, the current anode impedance and the lithium deposition potential threshold; and a controlling module, configured to charge the battery with current charging current.

In a first implementation of the second aspect, by combining the second aspect, the third calculating module is configured to determine the current charging current I according to a formula $I=(U_a-\eta)/R_a$; $U_a$ is the current anode open circuit voltage, $R_a$ is the current anode impedance, and $\eta$ is the lithium deposition potential threshold.

In a second implementation by combining the first implementation of the second aspect, the controlling module includes:

a detecting unit, configured to detect whether a charging voltage of the battery reaches a cut-off voltage when charging the battery;

a controlling unit, configured to charge the battery with the current charging current when the charging voltage of the battery is below the cut-off voltage; when the charging voltage of the battery reaches the cut-off voltage, maintaining the charging voltage, and charging the battery with a cut-off current until the battery is fully charged.

In a third implementation by combining the second implementation of the second aspect, the detecting module includes:

a first charging unit, configured to charge the battery with a test current;

a first determining unit, configured to determine an anode open circuit voltage curve corresponding to the battery by collecting a plurality of potential difference between an anode and a reference electrode in different state of charge when the battery is charged with the test current.

In a fourth implementation by combining the second implementation of the second aspect, the detecting module includes:

an obtaining unit, configured to obtain a first discharging potential and a second discharging potential of the battery, the first discharging potential is a potential of the battery after the battery is continuously discharged with a first discharging current within a first discharging period, and the second discharging potential is a potential of the battery after the battery is continuously discharged with a second discharging current within a second discharging period;

a calculating unit, configured to calculate an anode impedance according to a formula $R_a=(U_1-U_2)/(I_2-I_1)$; $U_1$ is the first discharging potential, $U_2$ is the second discharging potential, $I_2$ is the first discharging current, and $I_1$ is the second discharging current;

a second determining unit, configured to determine the anode impedance curve corresponding to the battery by collecting anode impedances of the battery in different state of charge respectively.

In a fifth implementation by combining the second implementation of the second aspect, the detecting module includes:

a second charging unit, configured to charge the battery with a maximum safe charging current;

a third determining unit, configured to determine the lithium deposition potential threshold by collecting a minimum potential difference from a plurality potential difference between an anode corresponding to the battery and a reference electrode when the battery is charged with a maximum safe charging current.

In a sixth implementation by combining the third, fourth or fifth implementation of the second aspect, the apparatus further includes:

a calibrating module, configured to adjust the obtained anode open circuit voltage curve and the anode impedance curve according to a current maximum available capacity of the battery when a number of charge cycles of the battery reaches a preset number.

In the method and the apparatus of battery charging according to embodiments of the present application, a series of important parameters such as the anode open circuit voltage curve, the anode impedance curve, the lithium deposition potential threshold and the state of charge are obtained, and the charging current is calculated based on these parameters, so that the anode potential will not drop to a potential value where lithium deposition occurs during a charging process, as a result, the problem of lithium deposition on the anode can be effectively avoided, and safety of the battery in use can be improved. Besides, in the case of preventing the anode from depositing lithium, an allowable maximum safe charging current is provided to the battery; therefore, compared with the conventional constant-current and constant-voltage charging manner, the present application also can significantly improve the charging speed.

BRIEF DESCRIPTION OF DRAWINGS

In order to illustrate the technical solutions of embodiments of the present application more clearly, the accompanying drawings used in the embodiments of the present application will be briefly introduced hereinafter. Apparently, the accompanying drawings show certain embodiments of the present application, and persons skilled in the art can derive other drawings from them without creative efforts.

DESCRIPTION OF EMBODIMENTS

In order to facilitate better understanding of the technical solutions of the present application, a detailed description of the embodiments of the present application will be provided with reference to the accompanying drawings.

Apparently, the embodiments described herein are only a part of the embodiments of the present application, rather than all the embodiments of the present application. All other embodiments derived by persons skilled in the art from the embodiments given herein without creative efforts shall fall within the protection scope of the present application.

The terminology used herein is merely for the purpose of describing particular embodiments and is not intended to limit the present application. In this specification and the appended claims, the singular forms "a", "an" and "the" are intended to include the plural forms as well, unless the context clearly indicates otherwise.

Figure 1:
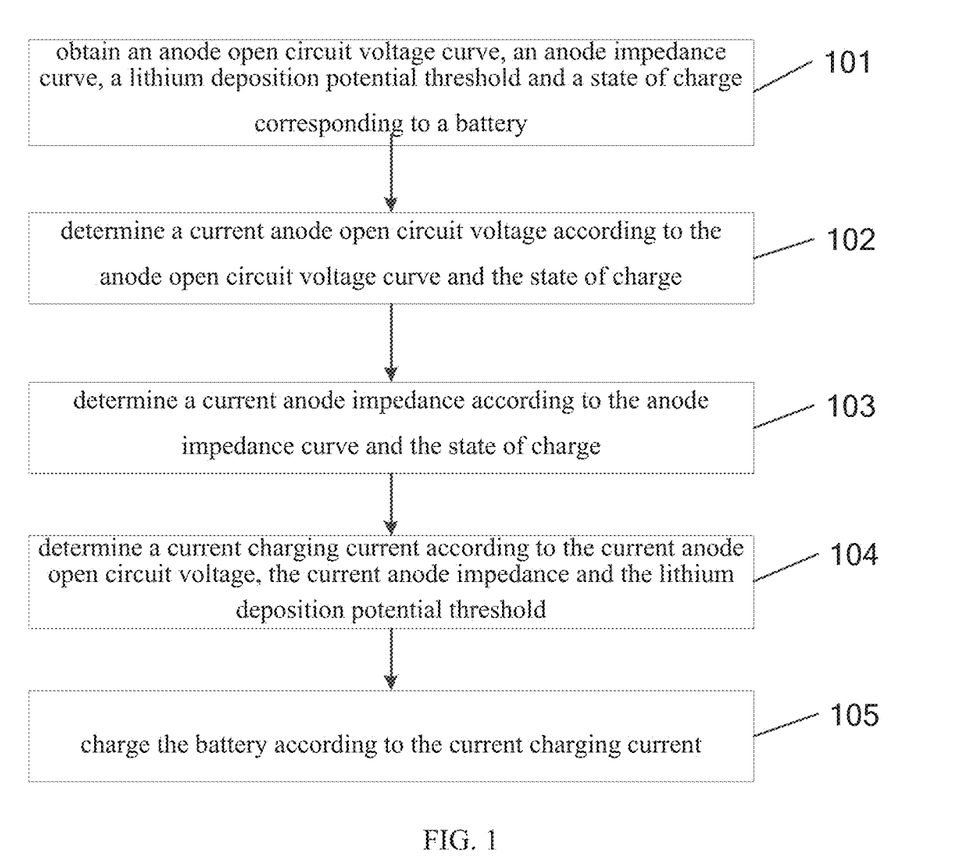
FIG. 1 is a flowchart of a method of battery charging according to an embodiment of the present application.

An embodiment of the present application provide a method of battery charging, which can cooperate with rechargeable batteries with the same type of a common lithium battery. As shown in FIG. 1, the method includes:

Step 101, obtain an anode open circuit voltage curve, an anode impedance curve, a lithium deposition potential threshold and a state of charge corresponding to a battery.

Figure 2:
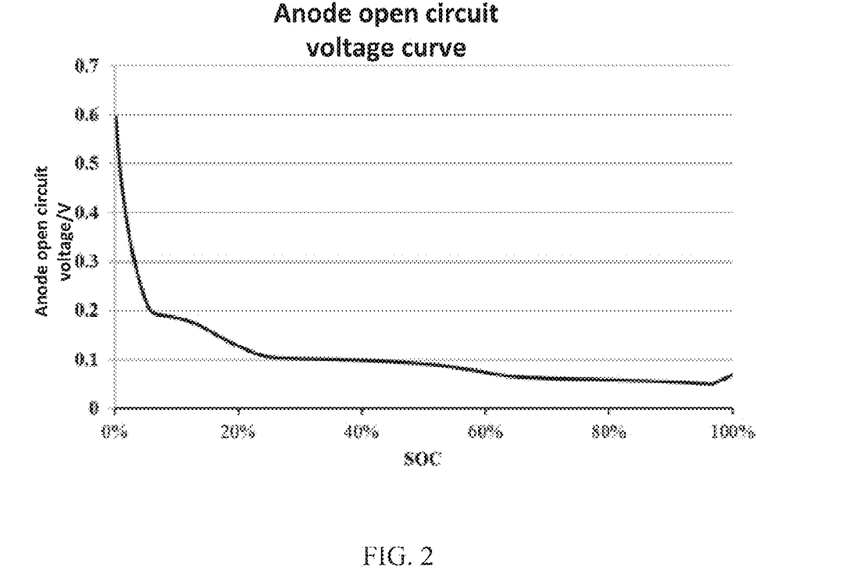
FIG. 2 is a schematic diagram of an anode open circuit voltage curve according to an embodiment of the present application.

Particularly, the anode open circuit voltage curve can be used to indicate changes of the anode potential when the battery is in different state of charge during a continuous charging process. FIG. 2 is a schematic diagram of an anode open circuit voltage curve, which is a function curve related to a state of charge (State of Charge, SOC, also known as 'remaining capacity').

Figure 3:
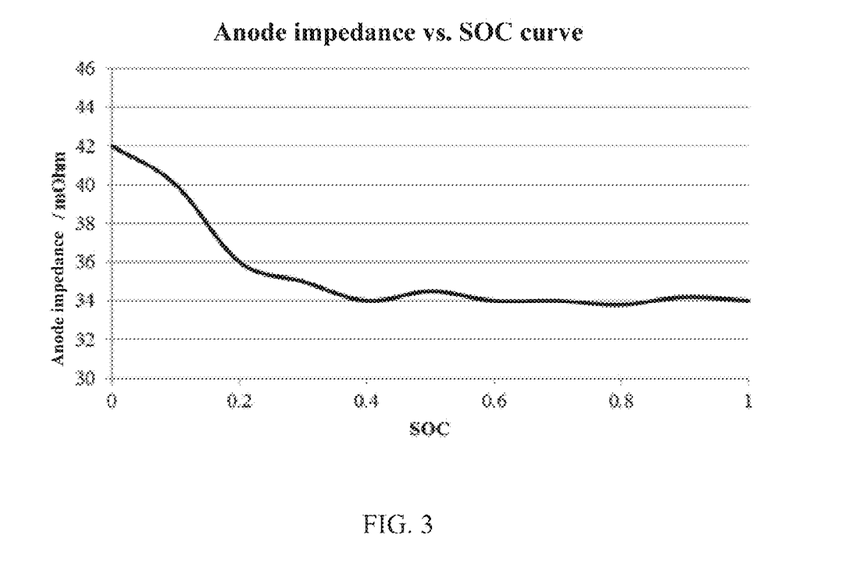
FIG. 3 is a schematic diagram of an SOC-related anode impedance curve according to an embodiment of the present application.

The anode impedance curve can be used to indicate changes of the anode impedance when the battery is in different state of charge. FIG. 3 is an anode impedance curve, which is a function curve related to an SOC.

The lithium deposition potential threshold is a basic parameter to prevent lithium from depositing when adjusting the charging current. The lithium deposition will occur when the anode potential is below the lithium deposition potential threshold during charging, otherwise the lithium deposition will not occur.

102, determine a current anode open circuit voltage according to the anode open circuit voltage curve and the state of charge.

103, determine a current anode impedance according to the anode impedance curve and the state of charge.

104, determine a current charging current according to the current anode open circuit voltage, the current anode impedance and the lithium deposition potential threshold.

In embodiments of the present application, the current charging current should be determined based on a formula $I=(U_a-\eta)/R_a$. In this formula, the $U_a$ is the current anode open circuit voltage, $R_a$ is the current anode impedance, and $\eta$ is the lithium deposition potential threshold. Minimum potential threshold when lithium deposition occurs on the anode is taken into account, therefore, charging the battery with the charging current calculated by this formula will not result in lithium deposition before reaching the cut-off charging voltage.

105, charge the battery according to the current charging current.

Additionally, it should be noted that the charging current in step 105 can maintain until the charging voltage reaches the cut-off voltage or the battery is fully charged.

In order to control the charging current more accurately, the charging period in step 105 can be controlled. That is, after charging for a certain period of time (in this case, the battery will reach a new state of charge), steps 101 to 104 can be performed again, and a new charging current can be calculated again based on the new state of charge. Then the newly calculated charging current is used to charge the battery for a certain period of time, repeating these steps until the charging voltage reaches the cut-off voltage or the battery is fully charged. The shorter the charging period is, the more frequently the charging current changes, but the better the protection on the battery is, on the contrary, the longer the charging period is, the smaller the charging current changes, and the protection on the battery is limited. The control during the charging period can be configured according to the actual requirements, for example, the charging period is set to be 1 s or 2 s, or the increment of state of charge is set to be 0.5% or 1%.

In the method of battery charging according to embodiments of the present application, a series of important parameters, such as the anode open circuit voltage curve, the anode impedance curve, the lithium deposition potential threshold and the state of charge are obtained, and the charging current is calculated based on these parameters, so that the anode potential will not drop to a potential threshold where lithium deposition may occur during charging, as a result, the problem of lithium deposition on the anode can be effectively avoided, which improves safety performance of the battery in use. Besides, in the case of preventing the anode from depositing lithium, an allowable maximum safe charging current is provided to the battery, therefore, compared with the conventional constant-current and constant-voltage charging manner, the present application can also significantly improve the charging speed.

With reference to the description of the above embodiments, another embodiment of the present application also provides the following implementation manner in terms of the method of obtaining the three parameters of the anode open circuit voltage curve, the anode impedance curve and the lithium deposition potential threshold mentioned in step 101.

Figure 4:
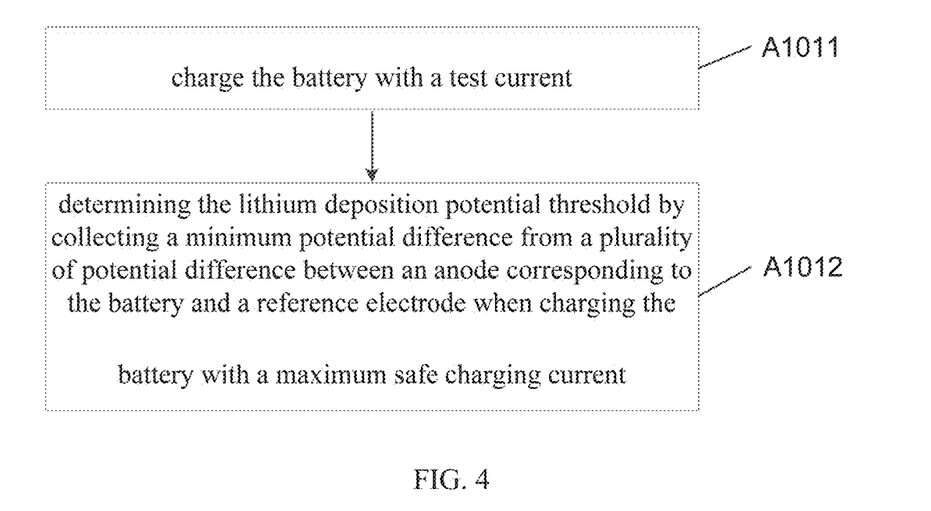
FIG. 4 is a flowchart of a method for obtaining an anode open circuit voltage curve according to an embodiment of the present application.

FIG. 4 is an implementation method of obtaining the anode open circuit voltage curve, which specifically includes:

A1011, charge the battery with a test current.

Particularly, the test current is a fixed value, which can be selected according to experience, and which is generally set between 0.01 C (rate) and 0.1 C.

A1012, determining the lithium deposition potential threshold by collecting a minimum potential difference from a plurality of potential difference between an anode corresponding to the battery and a reference electrode when charging the battery with a maximum safe charging current.

Here, it should be noted that if no reference electrode is provided within the battery, the above steps A1011 and A1012 can be performed by other auxiliary devices provided with a reference electrode function during manufacturing or testing of the battery.

Figure 5:
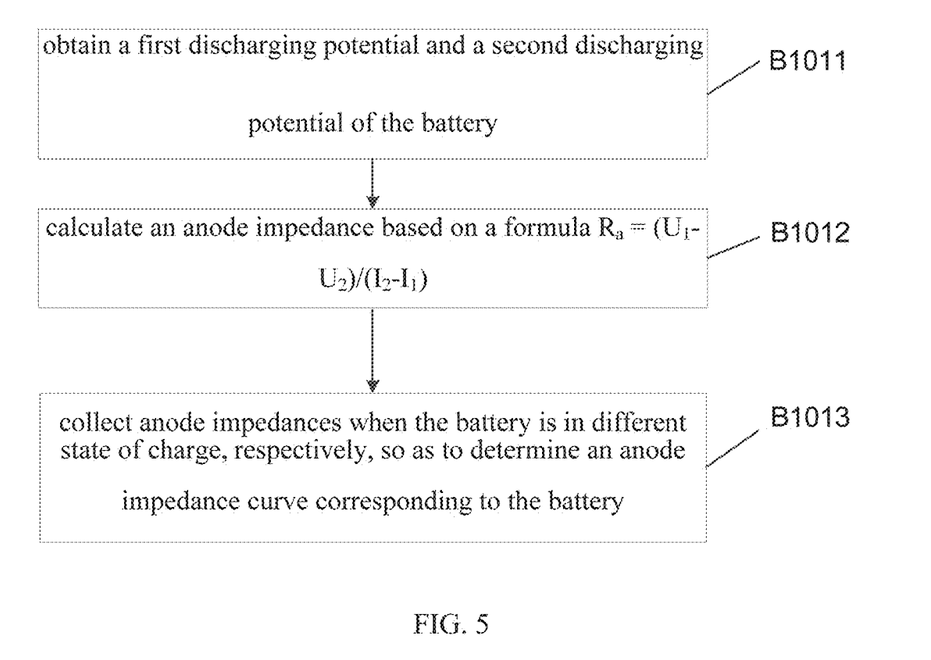
FIG. 5 is a flowchart of a method for obtaining an anode impedance according to an embodiment of the present application.

FIG. 5 is an implementation method of obtaining the anode impedance curve, which specifically includes:

B1011, obtain a first discharging potential and a second discharging potential of the battery.

Specifically, the first discharging potential is a potential after the battery is continuously discharged with a first discharging current within a first discharging period, and the second discharging potential is a potential after the battery is continuously discharged with a second discharging current within a second discharging period. For example, discharge for the first discharging period of 10 s with a first discharging current 0.1 C ($I_1$), and record an anode potential value $U_1$, i.e., the first discharging potential, after discharging is completed; discharge for the second discharging period of 1 s with a second discharging current 1 C ($I_2$), and record an anode potential value $U_2$, i.e., the second discharging potential, after discharging is completed.

It should be noted that, the first discharging current, the first discharging period, the second discharging current and the second discharging period can be set according to experience, 0.1 C, 1 C, 10 s and 1 s described above are only exemplary; which will not be limited by embodiments of the present application.

B1012, calculate an anode impedance based on a formula $R_a \leq (U_1 - U_2)/(I_2 - I_1)$.

B1013, collect anode impedances of the battery when the battery is in different state of charge, respectively, so as to determine an anode impedance curve corresponding to the battery.

Figure 6:
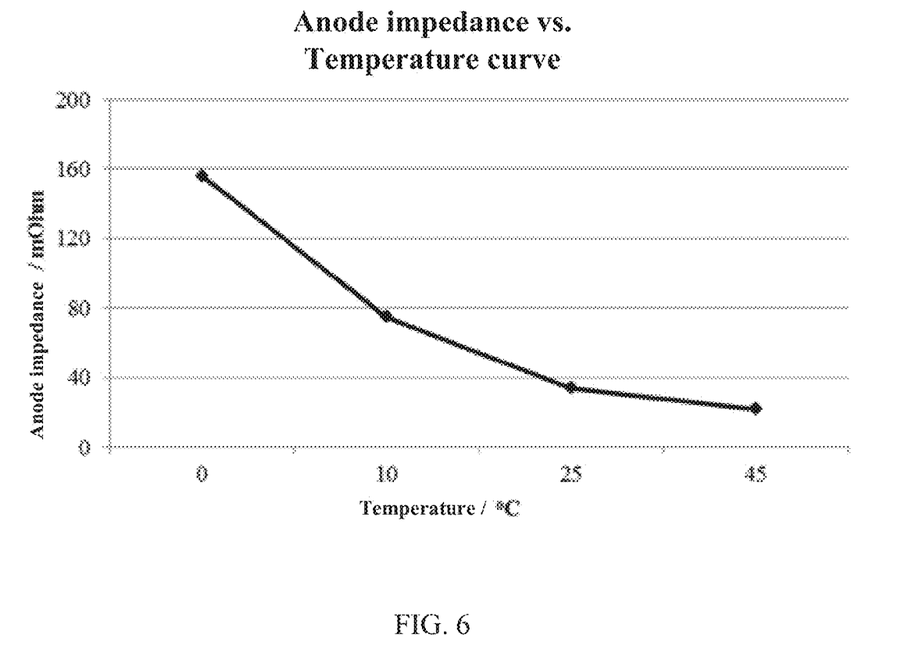
FIG. 6 is a schematic diagram of a temperature-related anode impedance curve according to an embodiment of the present application.

Additionally, it should be noted that, in the case that the battery may be used at different temperatures, a temperature-related anode impedance curve can also be measured according to the temperature, as shown in FIG. 6, the anode impedance curve obtained by step B1013 can be calibrated according to ambient temperature.

Figure 7:
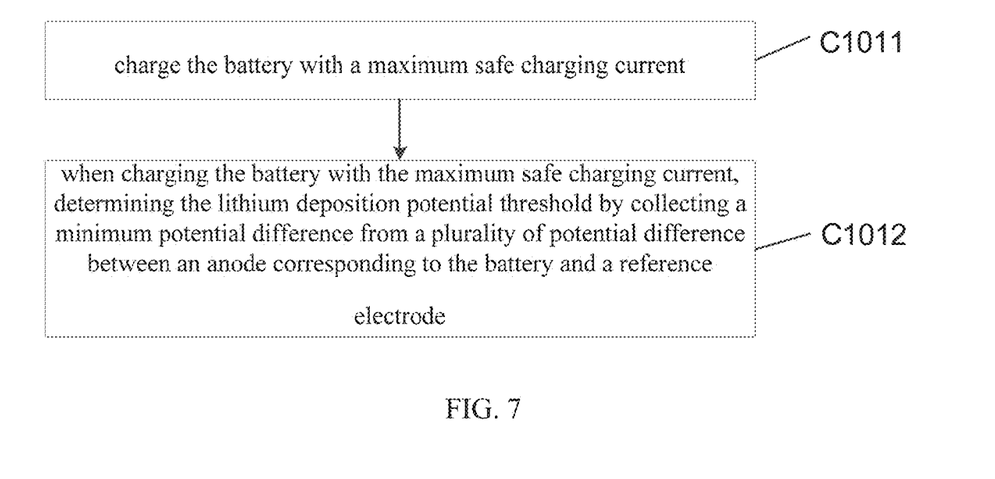
FIG. 7 is a flowchart of a method for obtaining a lithium deposition potential threshold according to an embodiment of the present application.

FIG. 7 is an implementation method of obtaining the lithium deposition potential threshold, which specifically includes:

C1011, charge the battery with a maximum safe charging current.

Particularly, the maximum safe charging current is an inherent hardware parameter of the battery, which generally cannot be changed.

C1012, when charging the battery with the maximum safe charging current, determining the lithium deposition potential threshold by collecting a minimum potential difference from a plurality of potential difference between an anode corresponding to the battery and a reference electrode.

Figure 8:
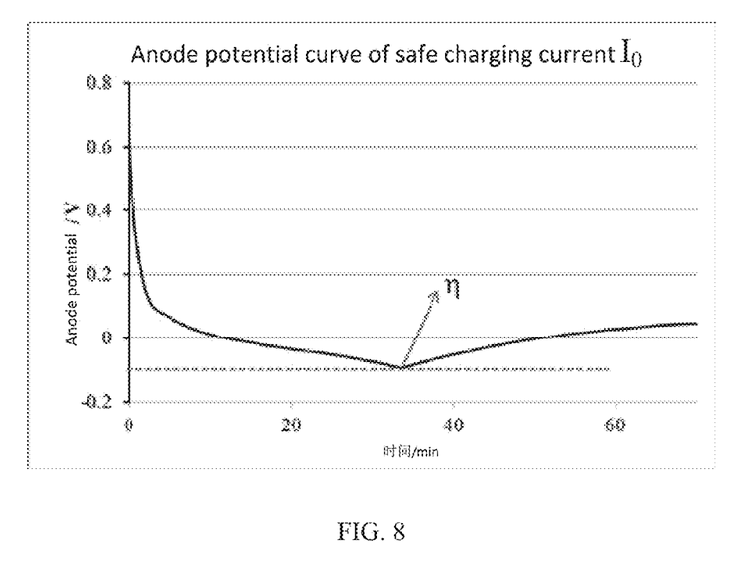
FIG. 8 is a schematic diagram of a curve showing change of a potential difference between an anode and a reference electrode in a process of charging the battery with a maximum safe charging current according to an embodiment of the present application.

FIG. 8 is a curve showing a change curve of a potential difference between an anode and a reference electrode in a process of charging the battery with the maximum safe charging current, the point η in the curve is the lithium deposition potential threshold.

Figure 9:
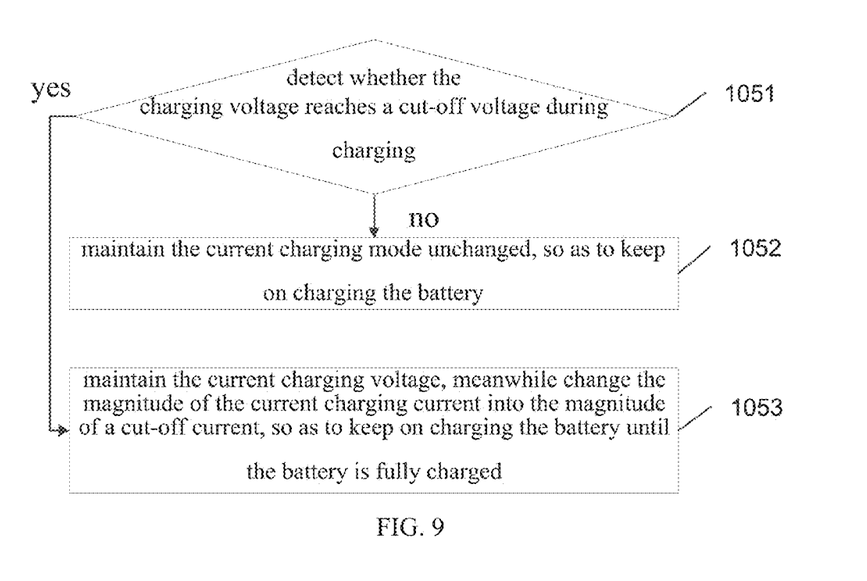
FIG. 9 is a flowchart of a method for adjusting a charging current according to an embodiment of the present application.

Furthermore, in order to guarantee the safety of the battery and prolong the battery life as much as possible, in another implementation manner of the embodiments of the present application, it is necessary to adjust the magnitude of the charging current based on the cut-off voltage of the battery in step 105. The specific steps are as shown in FIG. 9, the method includes:

1051, detect whether the charging voltage reaches a cut-off voltage during charging. If the charging voltage does not reach the cut-off voltage, perform step 1052, otherwise, perform step 1053.

1052, maintain the current charging mode, so as to maintain charging the battery.

1053, maintain the current charging voltage, meanwhile change the magnitude of the current charging current into the magnitude of a cut-off current, so as to maintain charging the battery until the battery is fully charged.

In this implementation manner, loss of the battery life due to an improper charging voltage or charging current during charging of the battery can be effectively avoided, by detecting the charging voltage and further adjusting the charging current.

Figure 10:
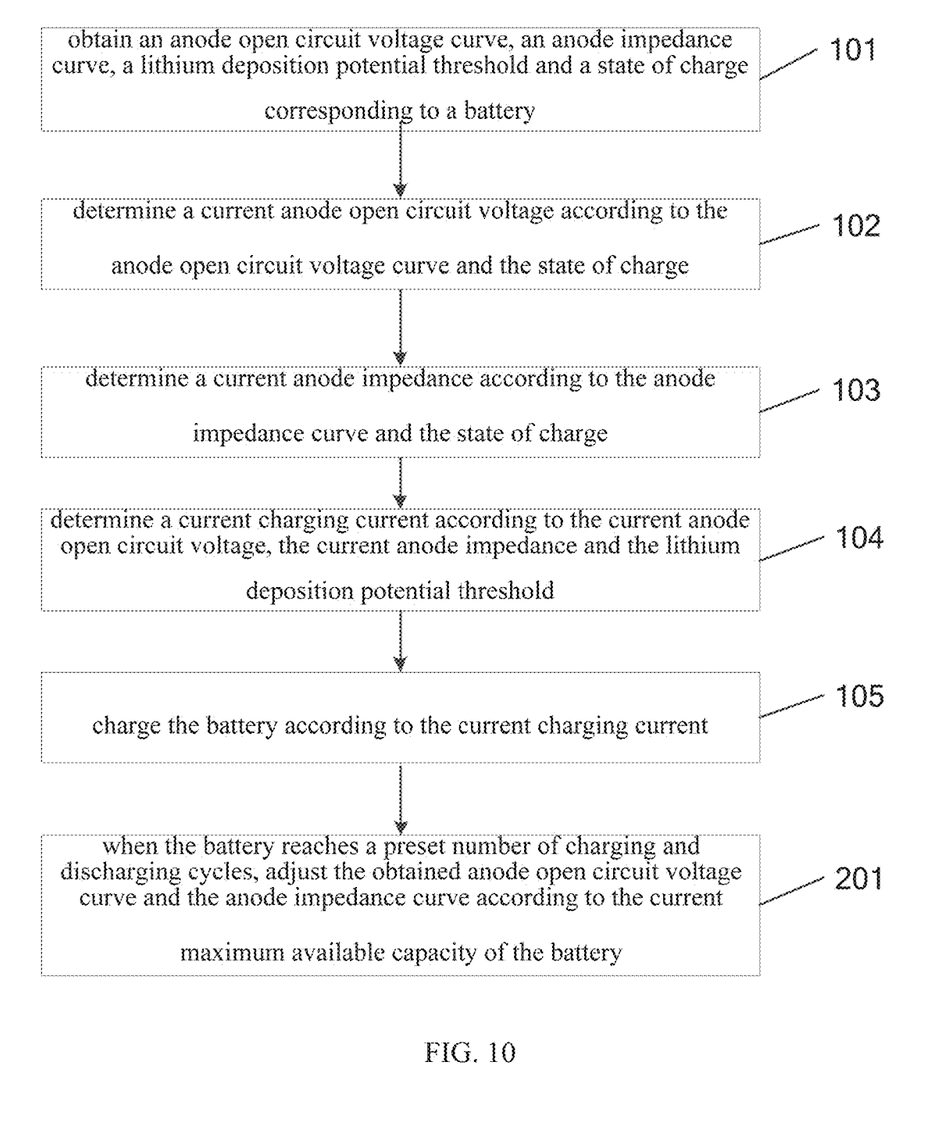
FIG. 10 is a flowchart of another method of battery charging according to an embodiment of the present application.

Additionally, the available maximum battery capacity will be gradually decreased as the number of the charging and discharging cycles increases, therefore, after a certain number of charging and discharging cycles, it is necessary to adjust the initial anode open circuit voltage curve and the anode impedance curve obtained in step 101, after step 105, by performing step 201. As shown in FIG. 10, the method includes:

201, when the battery reaches a preset number of charging and discharging cycles, adjust the obtained anode open circuit voltage curve and the anode impedance curve according to the current maximum available capacity of the battery.

The adjusting process can be deemed as a mathematical transformation on the two types of curves, it is assumed that 100% SOC in the anode open circuit voltage curve in FIG. 2 corresponds to a capacity of 4000 mah, after a certain number of charging and discharging cycles, 100% SOC of the battery only corresponds to a capacity of 3200 mah, then it is necessary to compress the initial anode open circuit voltage curve in the horizontal axis direction, so that the potential point moves from the position of 100% SOC to the position of 80% SOC, thereby forming the new anode open circuit voltage curve. The method for adjusting the anode impedance curve is similar to the method for adjusting anode open circuit voltage curve.

It should be noted that, the larger the preset number of charging and discharging cycles is, the higher the requirement on the calculating contents of the device for achieving calculation of the charging current is, however, a higher safety of the battery can also be provided at the same time. On the contrary, the less the preset number of charging and discharging cycles is, the lower the requirement on the calculating contents of the device for achieving calculation of the charging current is, however, the improvement on the safety of the battery is small at the same time.

With reference to the above implementation manners, the procedures and effects provided by the embodiments of the present application are described in detail in combination with batteries of the following specifications.

The battery in this embodiment is a three-electrode battery consisting of a cathode, an anode, a separator, electrolyte and a packaging housing, manufactured by assembling, formation aging, etc. Particularly, the cathode is a mixture of 96.7% LiCoO2+1.7% PVDF (as binder)+1.6% SP (as conductive agent), the anode is a mixture of 98% artificial graphite+1.0% SBR (as binder)+1.0% CMC (as thickener), the separator is a PP/PE/PP composite membrane, and the electrolyte is made by adding additive (0.5% VC, 5% FEC, 4% VEC) into organic solvent (30% EC+30% PC+40% DEC) and LiPF6.

The full-charge charging capacity (SOC) of the battery at 25° C. is 3900 mAh (0.2 C), the allowable maximum safe charging current $I_0$ of the battery is 1.3 C, the over-potential $\eta$ without lithium deposition is −70 mV, and the cut-off voltage $V_0$ is 4.35V.

Figure 11:
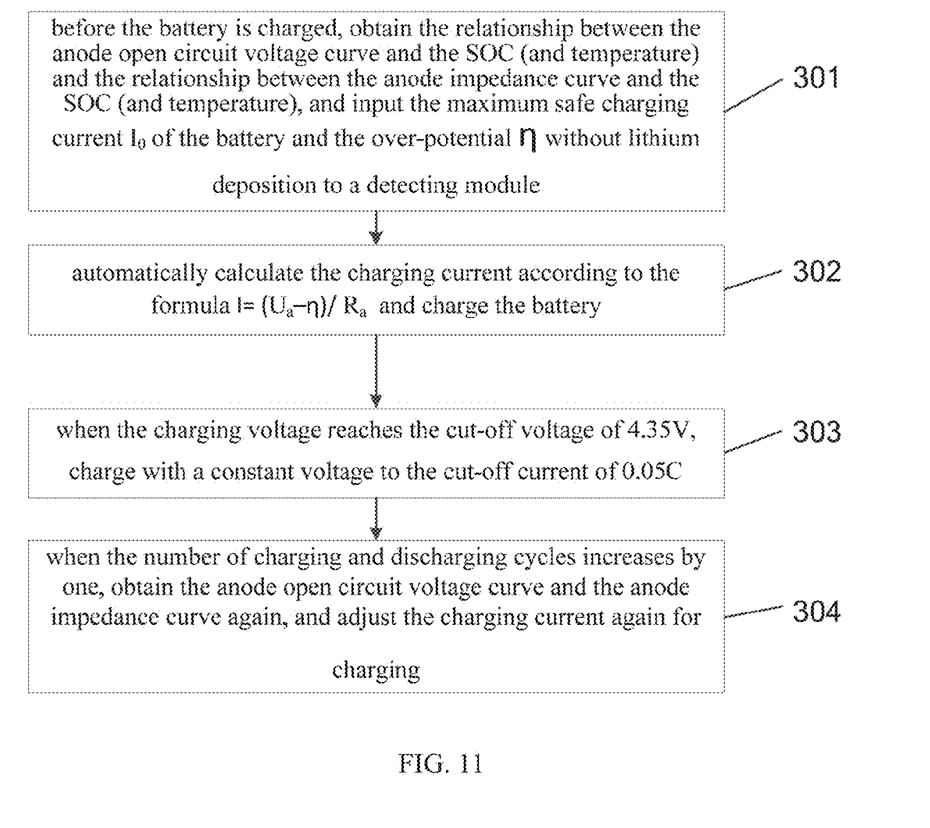
FIG. 11 is a flowchart of a specific implementation of battery charging according to an embodiment of the present application.

The procedure of the method is shown in FIG. 11, which includes:

301, before the battery is charged, obtain the relationship between the anode open circuit voltage curve and the SOC (and temperature) and the relationship between the anode impedance curve and the SOC (and temperature), and input the maximum safe charging current $I_0$ of the battery and the over-potential $\eta$ without lithium deposition to a detecting module.

302, calculate charging current according to the formula $I=(U_a-\eta)/R_a$ and charge the battery.

303, when the charging voltage reaches the cut-off voltage of 4.35V charge with a constant voltage to the cut-off current of 0.05 C.

304, when the number of charging and discharging cycles increases by one, obtain the anode open circuit voltage curve and the anode impedance curve again, and adjust the charging current again for charging.

Under this condition, the charging method in the prior art is to charge the battery with a conventional constant-current and constant-voltage charging mariner at 25° C. . That is, charge with a constant current of 1.5 C to a cut-off voltage of 4.35V, and then charge with a constant voltage of 4.35V to a cut-off current of 0.050.

Figure 12:
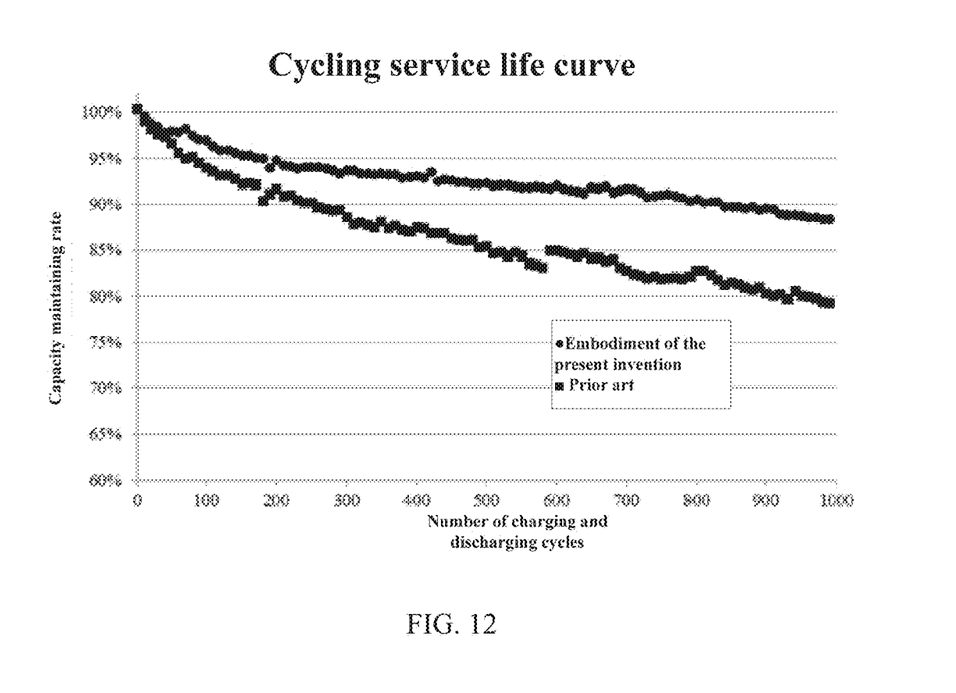
FIG. 12 is a contrast diagram on battery life between the charging methods according to an embodiment of the present application and the existing method.

Compared with the existing charging method, the method of battery charging according to the embodiments of the present application avoids a lithium deposition phenomenon, thus effectively improves safety of the battery, and thereby a long battery life is guaranteed. FIG. 12 shows the influence of the two methods on the battery life under the above conditions and different numbers of charging and discharging cycles, and obviously, the method of battery charging according to the embodiments of the present application provides a better battery life.

Figure 13:
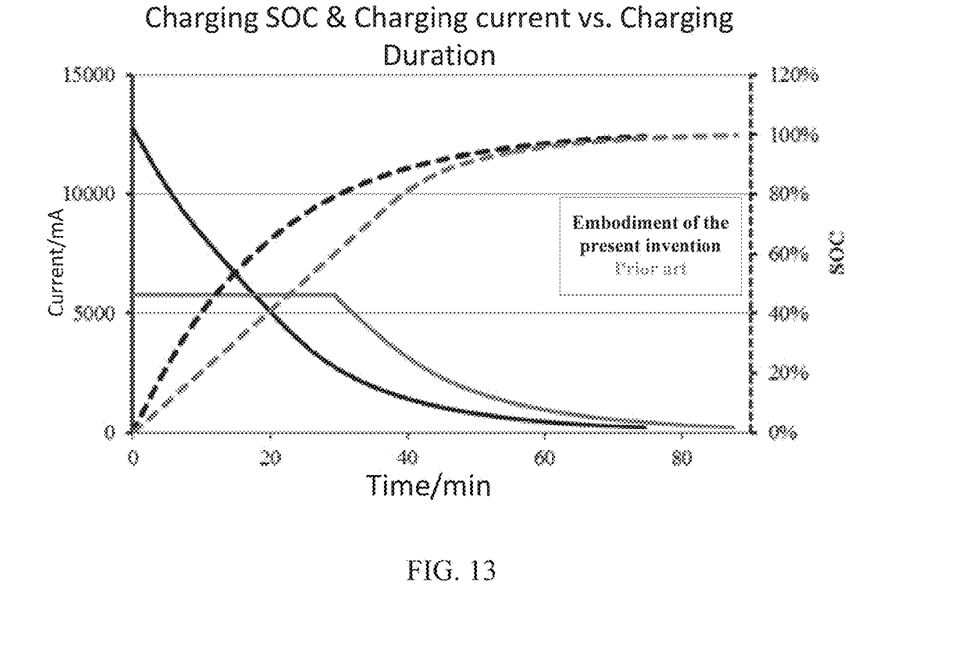
FIG. 13 is a contrast diagram on charging speed and charging current between the charging methods according to an embodiment of the present application and the existing method.

Besides, the improvement on the charging speed brought by the method of battery charging according to the embodiments of the present application is also obvious; as shown in FIG. 13, on a condition of achieving the same state of charge of the battery, the method of battery charging according to the embodiments of the present application performs better than the existing charging method in most cases.

Figure 14:
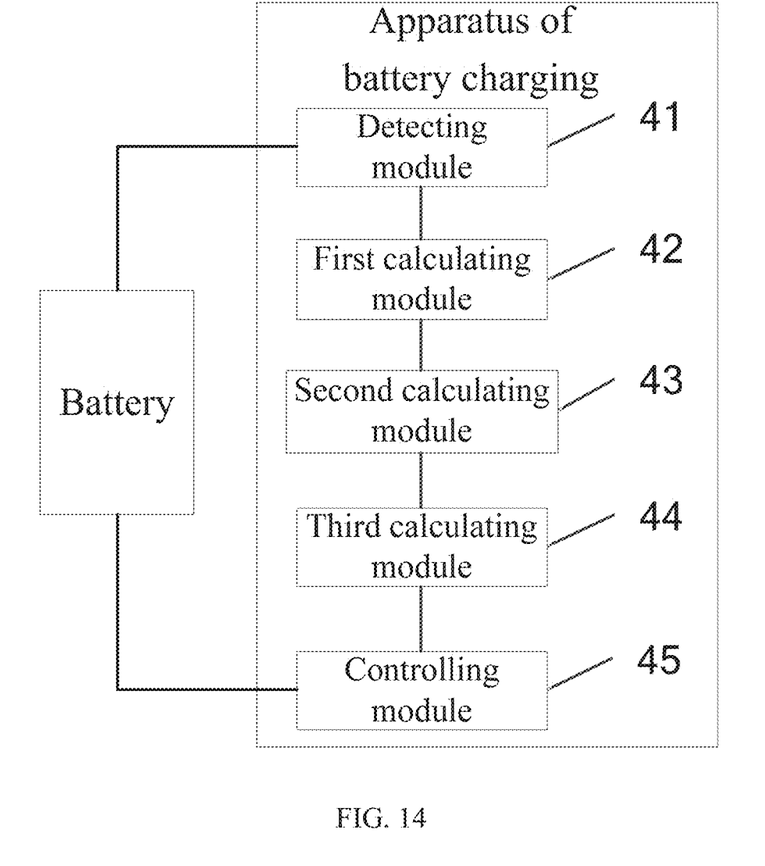
FIG. 14 is a composition block diagram of an apparatus of battery charging according to an embodiment of the present application.

The embodiments of the present application also provide an apparatus of battery charging, which is capable of implementing the processes of the above methods, as shown in FIG. 14, the apparatus includes:

a detecting module 41, configured to obtain an anode open circuit voltage curve, an anode impedance curve, a lithium deposition potential threshold and a state of charge corresponding to a battery.

a first calculating module 42, configured to determine a current anode open circuit voltage according to the anode open circuit voltage curve and the state of charge.

a second calculating module 43, configured to determine a current anode impedance according to the anode impedance curve and the state of charge.

a third calculating module 44, configured to determine a current charging current according to the current anode open circuit voltage, the current anode impedance and the lithium deposition potential threshold.

a controlling module 45, configured to charge the battery according to the current charging current.

Alternatively, the third calculating module 44 is specifically configured to determine the current charging current I, based on a formula $I=(U_a-\eta)/R_a$; $U_a$ is the current anode open circuit voltage, $R_a$ is the current anode impedance, and $\eta$ is the lithium deposition potential threshold.

Figure 15:
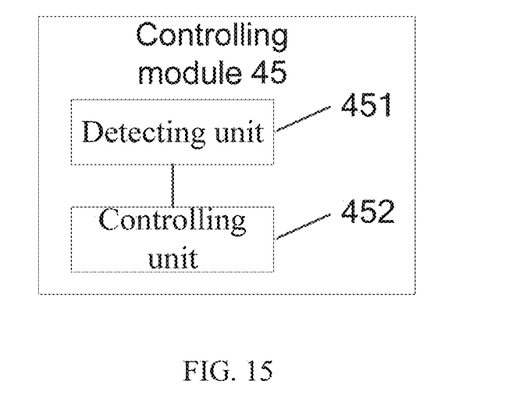
FIG. 15 is a composition block diagram of another apparatus of battery charging according to an embodiment of the present application.

Alternatively, as shown in FIG. 15, the controlling module 45 includes:

a detecting unit 451, configured to detect whether the charging voltage reaches a cut-off voltage during charging.

a controlling unit 452, configured to charge the battery with the current charging current when the charging voltage of the battery is below the cut-off voltage; when the charging voltage of the battery reaches the cut-off voltage, maintaining the charging voltage, and charging the battery with a cut-off current until the battery is fully charged.

Figure 16:
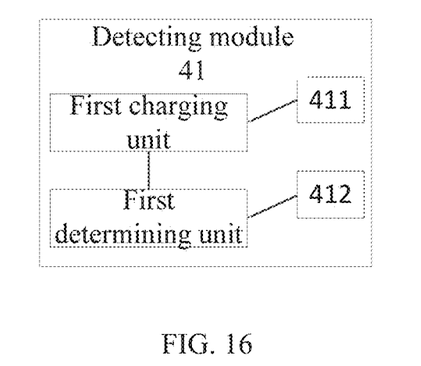
FIG. 16 is a composition block diagram of another apparatus of battery charging according to an embodiment of the present application.

Alternatively, as shown in FIG. 16, detecting module 41 includes:

a first charging unit 411, configured to charge the battery with a test current.

a first determining unit 412, configured to collect a potential difference between an anode and a reference electrode when the battery is in different state of charge, during charging the battery with the test current, so as to determine an anode open circuit voltage curve corresponding to the battery.

Figure 17:
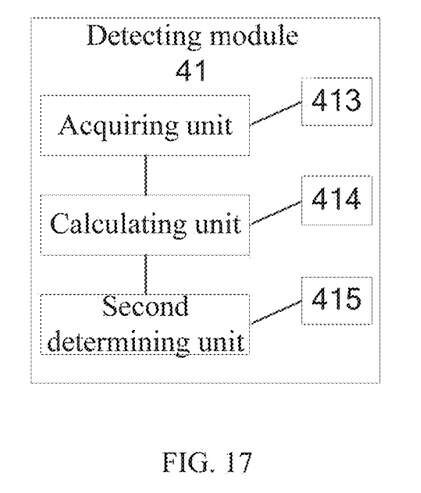
FIG. 17 is a composition block diagram of another apparatus of battery charging according to an embodiment of the present application.

Alternatively, as shown in FIG. 17, the detecting module 41 includes:

an obtaining unit 413, configured to obtain a first discharging potential and a second discharging potential of the battery, the first discharging potential is a potential after the battery is continuously discharged with a first discharging current within a first discharging period, and the second discharging potential is a potential after the battery is continuously discharged with a second discharging current within a second discharging period.

a calculating unit 414, configured to calculate an anode impedance based on a formula $R_a=(U_1-U_2)/(I_2-I_1)$; $U_1$ is the first discharging potential, $U_2$ is the second discharging potential, $I_2$ is the first discharging current, and $I_1$ is the second discharging current;

a second determining unit 415, configured to collect anode impedances of the battery when the battery is in different state of charge, respectively, so as to determine an anode impedance curve corresponding to the battery.

Figure 18:
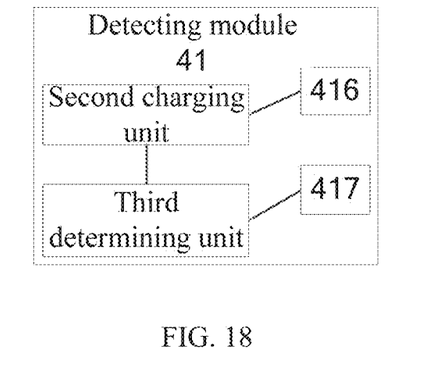
FIG. 18 is a composition block diagram of another apparatus of battery charging according to an embodiment of the present application.

Alternatively, as shown in FIG. 18, the detecting module 41 includes:

a second charging unit 416, configured to charge the battery with a maximum safe charging current.

a third determining unit 417, configured to determine the lithium deposition potential threshold by collecting a minimum potential difference from a plurality potential difference between an anode corresponding to the battery and a reference electrode when the battery is charged with a maximum safe charging current.

Figure 19:
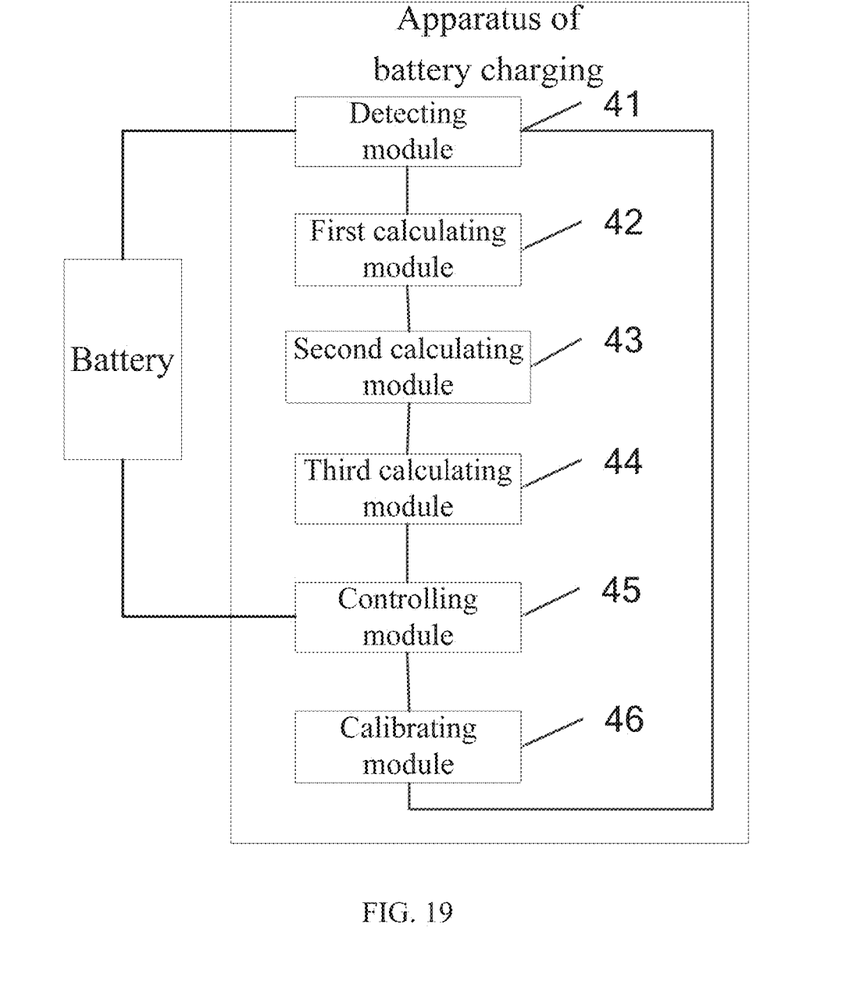
FIG. 19 is a composition block diagram of another apparatus of battery charging according to an embodiment of the present application.

Alternatively, as shown in FIG. 19, the apparatus further includes:

a calibrating module 46, configured to adjust the obtained anode open circuit voltage curve and the anode impedance curve according to the current maximum available capacity of the battery, when the battery reaches a preset number of charging and discharging cycles.

In the apparatus of battery charging according to embodiments of the present application, a series of important parameters such as the anode open circuit voltage curve, the anode impedance curve, the lithium deposition potential threshold and the state of charge are obtained, and the charging current is calculated based on these parameters, so that the anode potential will not drop to a potential threshold where lithium deposition may occur during a charging process, as a result, the problem of lithium deposition on the anode can be effectively avoided, which improves safety performance of the battery in use. Besides, in the case of preventing the anode from depositing lithium, an allowable maximum safe charging current is provided to the battery, therefore, compared with the conventional constant-current and constant-voltage charging manner, the present application can also significantly improve the charging speed.

Persons skilled in the art can clearly understand that, for convenience and conciseness of description, the detailed operating procedures of the systems, devices, and units described above can be referred to the corresponding procedures in the method embodiments, which will not be repeated herein.

It should be understood that, in the embodiments described herein, the disclosed systems, apparatuses and methods may be implemented in other manners. For example, the device embodiments above are exemplary, and the units of the device are defined from the perspective of logical functions only and may be defined in a different way in practical application. For example, multiple units or components may be combined or integrated into another system, or some features may be ignored or not executed. Besides, the coupling, direct coupling or communication connection illustrated or discussed herein may be implemented through interfaces, the indirect coupling or communication connection between devices or units may be electrical, mechanical, or in other forms.

The units described as stand-alone components above may be physically separated or not; and the components illustrated as units may be physical units or not, namely, they may be located in one place, or distributed on multiple network units. Some or all of the units described above may be selected as required to achieve the objectives of the technical solutions of the present application.

Besides, all functional units in the embodiments of the present application may be physically stand-alone, or integrated into a processing unit, or two or more of the units are integrated into one unit. The integrated unit above can be implemented in hardware, or a combination of hardware and software function units.

The integrated unit above implemented as a software function unit can be stored in a computer-readable storage medium. The software function unit above is stored in a storage medium and incorporates several instructions causing a computer device (for example, personal computer, server, or network device etc.) or a processor to execute part of the steps of the method according to each embodiment of the present application. Examples of the storage medium include various medium capable of storing program codes, such as USB flash disk, mobile hard disk, read-only memory (Read-Only Memory, ROM), random access memory (Random Access Memory, RAM), magnetic disk, or optical disk.

The embodiments described above are merely preferred embodiments of the present application and they do not limit the present application. Any modification, equivalent replacement, and improvement made within the spirit and principle of the present application shall fall within the scope of the present application.

What is claimed is:

1. A method of battery charging, comprising steps of:
   obtaining an anode open circuit voltage curve, an anode impedance curve, a lithium deposition potential threshold and a state of charge corresponding to a battery;
   determining a current anode open circuit voltage according to the anode open circuit voltage curve and the state of charge;
   determining a current anode impedance according to the anode impedance curve and the state of charge;
   determining a current charging current according to the current anode open circuit voltage, the current anode impedance and the lithium deposition potential threshold; and
   charging the battery with the current charging current.

2. The method according to claim 1, wherein the step of determining the current charging current according to the current anode open circuit voltage, the current anode impedance and the lithium deposition potential threshold comprises:
   determining the current charging current I according to a formula $I=(U_a-\eta)/R_a$;
   $U_a$ is the current anode open circuit voltage, $R_a$ is the current anode impedance, and $\eta$ is the lithium deposition potential threshold.

3. The method according to claim 2, wherein the step of charging the battery according to the current charging current comprises:
   detecting whether a charging voltage of the battery reaches a cut-off voltage when charging the battery;
   charging the battery with the current charging current when the charging voltage of the battery is below the cut-off voltage;
   when the charging voltage of the battery reaches the cut-off voltage, maintaining the charging voltage, and charging the battery with a cut-off current until the battery is fully charged.

4. The method according to claim 3, wherein the step of obtaining the anode open circuit voltage curve corresponding to the battery comprises:
   charging the battery with a test current;
   when charging the battery with the test current, determining the anode open circuit voltage curve corresponding to the battery by collecting a plurality of potential difference between an anode of the battery in different state of charge and a reference electrode, so as to determine the anode open circuit voltage curve corresponding to the battery.

5. The method according to claim 3, wherein the step of obtaining the anode impedance curve comprises:
   obtaining a first discharging potential and a second discharging potential of the battery, the first discharging potential is a potential of the battery after the battery is continuously discharged with a first discharging current within a first discharging period, and the second discharging potential is a potential of the battery after the battery is continuously discharged with a second discharging current within a second discharging period;

calculating an anode impedance according to a formula $R_a=(U_1-U_2)/(I_2-I_1)$, $U_1$ is the first discharging potential, $U_2$ is the second discharging potential, $I_2$ is the first discharging current, and $I_1$ is the second discharging current;

determining the anode impedance curve corresponding to the battery by collecting anode impedances of the battery in different state of charge respectively.

6. The method according to claim 3, wherein the step of obtaining the lithium deposition potential threshold comprises:

charging the battery with a maximum safe charging current;

determining the lithium deposition potential threshold by collecting a minimum potential difference from a plurality of potential difference between an anode corresponding to the battery and a reference electrode when charging the battery with a maximum safe charging current.

7. The method according to claim 4, wherein after the step of charging the battery according to the current charging current the method further comprises:

when a number of charge cycles of the battery reaches a preset number, adjusting the obtained anode open circuit voltage curve and the anode impedance curve according to a current maximum available capacity of the battery.

8. An apparatus of battery charging, comprising:

a detecting module, configured to obtain an anode open circuit voltage curve, an anode impedance curve, a lithium deposition potential threshold and a state of charge corresponding to a battery;

a first calculating module, configured to determine a current anode open circuit voltage according to the anode open circuit voltage curve and the state of charge;

a second calculating module, configured to determine a current anode impedance according to the anode impedance curve and the state of charge;

a third calculating module, configured to determine a current charging current according to the current anode open circuit voltage, the current anode impedance and the lithium deposition potential threshold; and a controlling module, configured to charge the battery with the current charging current.

9. The apparatus according to claim 8, wherein the third calculating module is configured to determine the current charging current I according to a formula $I=(U_a-\eta)/R_a$, $U_a$ is the current anode open circuit voltage, $R_a$ is the current anode impedance, and $\eta$ is the lithium deposition potential threshold.

10. The apparatus according to claim 9, wherein the controlling module comprises:

a detecting unit, configured to detect whether a charging voltage of the battery reaches a cut-off voltage when charging the battery;

a controlling unit, configured to charge the battery with the current charging current when the charging voltage of the battery is below the cut-off voltage; when the charging voltage of the battery reaches the cut-off voltage, maintaining the charging voltage, and charging the battery with a cut-off current until the battery is fully charged.

11. The apparatus according to claim 10, wherein, the detecting module comprises:

a first charging unit, configured to charge the battery with a test current;

a first determining unit, configured to determine an anode open circuit voltage curve corresponding to the battery by collecting a plurality of potential difference between an anode and a reference electrode in different state of charge when the battery is charged with the test current.

12. The apparatus according to claim 10, wherein, the detecting module comprises:

an obtaining unit, configured to obtain a first discharging potential and a second discharging potential of the battery, the first discharging potential is a potential of the battery after the battery is continuously discharged with a first discharging current within a first discharging period, and the second discharging potential is a potential of the battery after the battery is continuously discharged with a second discharging current within a second discharging period;

a calculating unit, configured to calculate an anode impedance according to a formula $R_a=(U_1-U_2)/(I_2-I_1)$; wherein, $U_1$ is the first discharging potential, $U_2$ is the second discharging potential, $I_2$ is the first discharging current, and $I_1$ is the second discharging current;

a second determining unit, configured to determine the anode impedance curve corresponding to the battery by collecting anode impedances of the battery in different state of charge respectively.

13. The apparatus according to claim 10, wherein, the detecting module comprises:

a second charging unit, configured to charge the battery with a maximum safe charging current;

a third determining unit, configured to determine the lithium deposition potential threshold by collecting a minimum potential difference from a plurality potential difference between an anode corresponding to the battery and a reference electrode when the battery is charged with a maximum safe charging current.

14. The apparatus according to claim 11, wherein, further comprising:

a calibrating module, configured to adjust the obtained anode open circuit voltage curve and the anode impedance curve according to a current maximum available capacity of the battery when a number of charge cycles of the battery reaches a preset number.

* * * * *